United States Patent [19]

Etchells

[11] 4,052,493

[45] Oct. 4, 1977

[54] PROCESS FOR PRODUCING CONDUCTIVE FIBER

[75] Inventor: Sylvia Etchells, Pontypool, England

[73] Assignee: Imperial Chemical Industries, Ltd., Millbank, England

[21] Appl. No.: 304,867

[22] Filed: Nov. 8, 1972

[30] Foreign Application Priority Data

Oct. 26, 1971 United Kingdom ............... 49643/71

[51] Int. Cl.$^2$ .......................... C08L 77/00; B29H 7/20
[52] U.S. Cl. ................... 264/49; 260/78 SC; 260/462 R; 260/857 PE; 264/211
[58] Field of Search .......... 260/78 SC, 857 PE, 2 EP, 260/462 R, 462 A, 462 C; 264/211, 49

[56] References Cited

U.S. PATENT DOCUMENTS

| | | | |
|---|---|---|---|
| 2,677,700 | 5/1954 | Jackson et al. | 260/462 R |
| 2,755,296 | 7/1956 | Kirkpatrick | 260/462 R |
| 2,949,439 | 8/1960 | Fuchsman et al. | 260/462 R |
| 2,960,521 | 11/1960 | Heyden | 260/462 R |
| 3,281,477 | 10/1966 | Nelson | 260/462 A |
| 3,329,557 | 7/1967 | Magaf et al. | 260/857 PE |
| 3,454,623 | 7/1969 | Graham | 260/91.3 VA |
| 3,459,251 | 8/1969 | Kibler | 260/857 PE |
| 3,475,898 | 11/1969 | Magaf et al. | 260/857 PE |
| 3,637,794 | 1/1972 | Sawyer et al. | 260/462 |

*Primary Examiner*—Jay H. Woo
*Attorney, Agent, or Firm*—Robert J. Blanke

[57] ABSTRACT

A conductive fiber having soil-hiding properties and good dye light fastness properties comprising a fiber-forming polyamide having an additive dispersed therein as a separate phase, the additive being derived from a boric acid and a poly(oxyalkylene) material of average molecular weight at least 600. The soil-hiding properties are produced on scouring the fiber.

7 Claims, No Drawings

PROCESS FOR PRODUCING CONDUCTIVE FIBER

The present invention relates to conductive fibres and to textile articles derived therefrom.

The term fibre as used herein includes continuous filament and staple fibre.

Conductive fibres, particularly those also having soil-hiding properties, are useful in carpets.

Due to their hydrophilic properties and ease of manufacture, poly(oxyalkylene) materials have been suggested and used as conductive additives in synthetic fibres. British Patent Specification 990,713 discloses polyamide fibres having blended therein as a separate phase at least 1% by weight of a poly(alkylene ether) glycol. It has been found in practice that poly(oxyalkylene) additives, although confering useful conductive properties to the fibre, have an extremely detrimental effort on the dye light fastness properties of the fibre.

We have now found that a useful conductive fibre, which overcomes the above-mentioned deficiency of the prior art fibres, comprises a fibre-forming polyamide having dispersed therein as a separate phase between 1% and 14%, preferably between 2% and 8%, by weight inclusive of an additive which is derived from a boric acid and a poly(oxyalkylene) material of average molecular weight at least 600.

The separate dispersed phase in the fibre is in the form of small particles elongated in the direction parallel to the axis of the fibre.

The additive may be made by reacting boric acid with a poly(oxyalkylene) material having at least one free hydroxyl group. Examples of boric acids which may be used include ortho-, meta- and pyro-boric acid.

Suitable poly(oxyalkylene) materials include ethylene oxide, propylene oxide or ethylene oxide - propylene oxide condensation products. Residues of chain-initiating or coupling compounds may be present. Poly(oxyethylene) glycol is particularly preferred. It is preferred that the poly(oxyalkylene) material has an average molecular weight within the range 600 to 30,000.

The additive may be added as a poly(oxyalkylene) borate or in the form of the precursors. It may be incorporated in the fibre-forming polyamide at any stage of manufacture. Thus the additive may be incorporated in the polyamide monomer prior to polymerisation or it may be incorporated in the preformed polyamide immediately prior to extrusion of fibre.

Suitable fibre-forming polymers for use in the present invention are polyamides such as poly(hexamethylene adipamide) or polycaproamide.

When fibres containing the additive particles are scoured, or subjected to a similar wet treatment, some of the particles are extracted and leave internal voids which increase the covering power and soil-hiding ability of the fibres.

The fibres of the present invention may optionally contain other additives such as antioxidants, stabilisers, delustrants or colouring materials. Such additives may be present in either or both or the two phases. Suitable antioxidants include hindered phenols such as, for example, 2,4-dimethyl-6-α-methylcyclohexylphenol;1,1,3-tris-(2'-methyl-4'-hydroxy-5'-t-butylphenyl) butane and bis (2-methyl-4-hydroxy-5-t-butyl-phenyl) sulphide.

The following examples, in which all parts and percentages are by weight, illustrate but do not limit the present invention.

EXAMPLE 1

Poly(hexamethylene adipamide) containing approximately 7% by weight of additive was prepared by adding polyoxyethylene glycol of average molecular weight 1540 (250 parts) and ortho-boric acid (7 parts) to hexamethylene adipamide salt (4000 parts) in an autoclave and subjecting the salt to polymerization. The polymer was extruded at 290° C in the form of a carpet yarn having 68 trilobal filaments. The yarn was drawn and then immediately bulked by a stuffer-box crimping process and then used in the preparation of a tufted carpet. The yarn had the following properties:

Decitex 2917, tenacity 2.3 g/dtex, extension to break 67.9% and modification ratio 2.3. The yarn had an electrical resistance of $3.3 \times 10^{11}$, $3.9 \times 10^{10}$ and $1.4 \times 10^{9}$ ohms/cm at relative humidities of 21%, and 65% respectively.

Samples of the tufted carpet were scoured and then dyed at pH 6.5 at 95° C for 60 minutes with a range of acid dyestuffs. The dye light fastness properties of the carpet samples were measured and the results are given below. For comparison, results are given for carpet samples made from (i) poly(hexamethylene adipamide) fibres and (ii) fibres made from poly(hexamethylene adipamide) having polyoxyethylene glycol (PEG) of average molecular weight 20,000 dispersed therein as a separate phase.

| Dyestuff | Light Fastness | | |
|---|---|---|---|
| | Fibres according to present invention | Nylon 6,6 | Nylon 6,6 and PEG |
| Nylomine Yellow A-Gs | 6 | 6 | 3 |
| Nylomine Red A-2BS | 5 | 6 | 3 |
| Nylomine Blue A-2R | 6-7 | 6-7 | 3 |
| Nylomine Acid Yellow B-RD | 5 | 5-6 | 3 |
| Nylomine Acid Blue B-B | 6-7 | 6-7 | 3 |
| Nylomine Acid Green C-B | 6-7 | 6-7 | 3-4 |

The above results show that the dye light fastness of nylon 6,6 fibres containing an additive derived from a boric acid and a polyoxyethylene glycol are similar to those for normal nylon 6,6 fibres and are much superior to those of nylon 6,6 fibres containing polyoxyethylene glycol.

Samples of the scoured and dyed carpets were tested for static propensity by measuring the voltage generated at 20% R.H. and 20° C. while walking on the carpet with shoes having composition soles. The voltages generated for nylon 6,6 containing the additive derived from boric acid and polyoxyethylene glycol, nylon 6,6 and nylon 6,6 containing polyoxyethylene glycol were 2.4, greater than 5.0 and 2.7 kilovolts respectively.

A further sample of the scoured and dyed carpet, made from the nylon 6,6 fibres containing the additive derived from boric acid and polyoxyethylene glycol, was subjected to floor trials. After 28 days use, the carpet had a soiling additional density of only 0.197. Under comparable conditions, a carpet made from nylon 6,6 fibres had a soiling additional density of 0.285.

EXAMPLE 2

An additive was prepared by heating dry meta-boric acid (18.3 parts) and polyoxyethylene glycol of average molecular weight 1540 (846.8 parts) for one hour at 230° C under atmospheric pressure. The additive formed a crystalline mass on cooling and was then chipped. The chipped additive (7 parts) was chip-mixed with poly(hexamethylene adipamide) chip (93 parts). The mixture was melt-spun and then drawn to yield a 224 dtex, 20 filament yarn. After scouring, the yarn had an electrical resistance, measured at 40% R.H., of $1.2 \times 10^{10}$ ohms/cm.

EXAMPLE 3

Example 2 was repeated except that the additive was prepared by heating pyro-boric acid (13.1 parts) and polyoxyethylene glycol of average molecular weight 1540 (675 parts).

The resultant yarn, after scouring, had an electrical resistance, measured at 40% R.H., of $1.2 \times 10^{10}$ ohms/cm.

What I claim is:

1. A process for producing fibre which comprises melt spinning a fibre-forming polyamide having dispersed therein as a separate phase between 1% and 14% by weight inclusive of a additive which is the reaction product of a boric acid and a polyoxyalkylene material of average molecular weight within the range 600 to 30,000.

2. A process according to claim 1 in which the fibre is subsequently subjected to a wet treatment such that some of the additive is extracted to leave internal voids in the fibre.

3. The process according to claim 1 where said additive is the reaction product of boric acid and a polyoxyalkylene material having at least one free hydroxyl group.

4. The process according to claim 1 wherein the reaction product is added to the polyamide forming reactants prior to the polymerization of the polyamide.

5. The process accordingg to claim 1 wherein the reaction product is added to preformed polyamide prior to extrusion of the fiber.

6. The process according to claim 1 wherein boric acid and polyoxyalkylene material are added to the polyamide forming reactants prior to polymerization.

7. The process according to claim 1 wherein boric acid and polyoxyalkylene material are added to preformed polyamides prior to the extrusion of fiber.

* * * * *